United States Patent [19]
Tarlton et al.

[11] Patent Number: 5,923,330
[45] Date of Patent: Jul. 13, 1999

[54] SYSTEM AND METHOD FOR NAVIGATION AND INTERACTION IN STRUCTURED INFORMATION SPACES

[75] Inventors: Prakairut Tarlton; Mark A. Tarlton, both of Dunwoody, Ga.

[73] Assignee: NCR Corporation, Dayton, Ohio

[21] Appl. No.: 08/695,470

[22] Filed: Aug. 12, 1996

[51] Int. Cl.[6] ................................................. G06F 17/50
[52] U.S. Cl. ........................................................... 345/419
[58] Field of Search ..................................... 345/355, 127, 345/160, 419, 428, 356, 357, 473, 474; 463/30, 31, 32, 33; 707/526

[56] References Cited

U.S. PATENT DOCUMENTS

| | | | |
|---|---|---|---|
| 4,613,946 | 9/1986 | Forman | 364/518 |
| 4,821,211 | 4/1989 | Torres | 364/521 |
| 5,021,976 | 6/1991 | Wexelblat et al. | 364/521 |
| 5,073,771 | 12/1991 | Satta et al. | 340/721 |
| 5,119,477 | 6/1992 | Ebbers | 395/160 |
| 5,262,761 | 11/1993 | Scandura et al. | 340/133 |
| 5,287,514 | 2/1994 | Gram | 395/700 |
| 5,295,243 | 3/1994 | Robertson et al. | 395/160 |
| 5,317,686 | 5/1994 | Salas et al. | 395/157 |
| 5,555,354 | 9/1996 | Strasnick et al. | 395/127 |
| 5,682,469 | 10/1997 | Linnett et al. | 395/173 |
| 5,689,628 | 11/1997 | Robertson | 395/127 |
| 5,689,669 | 11/1997 | Lynch et al. | 395/355 |
| 5,701,467 | 12/1997 | Freeston | 395/611 |

OTHER PUBLICATIONS

Conference Companion, CHI '94, "Pad++: Advances in Multiscale Interfaces", by Benjamin Bederson, Larry Stead, and James Hollan, Apr. 1994.

*Primary Examiner*—Joseph H. Feild
*Assistant Examiner*—A. Kindred
*Attorney, Agent, or Firm*—Needle & Rosenberg; Peter H. Priest

[57] ABSTRACT

A method and system for generating an interactive, multi-resolution presentation space of information structures within a computer enabling a user to navigate and interact with the information. The presentation space is hierarchically structured into a tree of nested visualization elements. A visual display is generated for the user which has a plurality of iconic representations and visual features corresponding to the visualization elements and the parameters defined for each visualization element. The user is allowed to interact in the presentation space through a point of view or avatar. The viewing resolution of the avatar is varied depending on the position of the avatar relative to a visualization element. Culling and pruning of the presentation space is performed depending on the size of a visualization element and its distance from the avatar.

18 Claims, 12 Drawing Sheets

VIEW SCALE = 5.0

FIG. 17B

VIEW SCALE = 1.0

FIG. 17C

VIEW SCALE = 0.1

FIG. 17D

VIEW SCALE = 0.33

NODES: 1, 2, 3, 4, 5, 6, 7
RELATIONSHIPS: A,B,C

FIG. 19B

HIERARCHY STARTING
AT NODE 1 VIA
RELATIONSHIP A

FIG. 19C

HIERARCHY STARTING
AT NODE 1 USING
RELATIONSHIP B

SYSTEM AND METHOD FOR NAVIGATION AND INTERACTION IN STRUCTURED INFORMATION SPACES

BACKGROUND OF THE INVENTION

1. Field of the Invention

The present invention relates to a system and method for navigating, presenting, and interacting with information in on-line computer systems.

2. Description of the Prior Art

Existing approaches to distributed, multi-user information systems (i.e., World-Wide Web WWW) are primarily textual in nature and remain to a large extent for experienced computer users. While text is a good method of describing information, it is not the best way to access, present or navigate through information. For example, web pages on the Internet today consist mostly of two dimensional text and images. An example of a 2D web page is the United States Patent Office home page located at "http://www.uspto.gov".

To navigate through the information, the user is presented with a "web page" containing a number of textual items that they must read and choose between. Once the user makes a selection by clicking on a "hot-link" (i.e., highlighted text) a new web-page appears containing another set of choices and the process is repeated. One problem with this approach is that it is very difficult for the user to see the overall organization or structure of the information. If the information has a hierarchical structure, the practical limits of this navigational approach is only a few thousand items. Beyond this, either the number of choices on the screen become excessive or the search depth becomes so deep that users become frustrated and lost.

In these systems, individual users are often unaware of the presence of others in the information space. The model for on-line services is primarily the time-sharing virtual machine model where each user is made to think that they are the only person using the machine. The resulting sense of isolation is in contrast to people's everyday experience of sensing and gathering information as a public, social experience.

SUMMARY OF THE INVENTION

The present invention is a system and method of presenting and navigating through hierarchically structured information. The invention relates the hierarchical structure of the information to the spatial attributes of the graphical elements that represent the information. The result is a "multi-resolution" graphical presentation where the size of a graphical object is a function of the level in the hierarchy of its corresponding information element and where the position of a graphical object is a function of the relationships between information elements. The result is a "nesting" of graphical objects that corresponds to the hierarchical structure of the information. This nesting enables the relationships between information elements to be more clearly communicated and explored by the user.

The application of this invention uses a "virtual world" metaphor where the user is represented as a point-of-view or avatar within a three-dimensional world and where the objects in the world represent aspects of the information. The user presence in the information space may be represented as a graphical object. This graphical representation of the user is termed an "avatar." The user navigates through the information by moving his point-of-view or avatar through the scene. The avatar's position in the presentation space specifies the information of current interest.

DETAILED DESCRIPTION OF THE INVENTION

A preferred embodiment of the invention is now described in detail. Referring to the drawings, like numbers indicate like parts throughout the views.

Figure 19A:
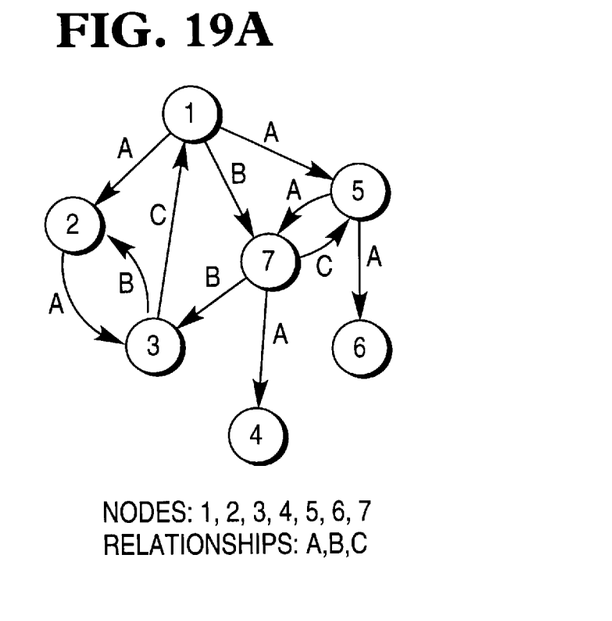
FIG. 19A is a node and relationship diagram.
Figure 19B:
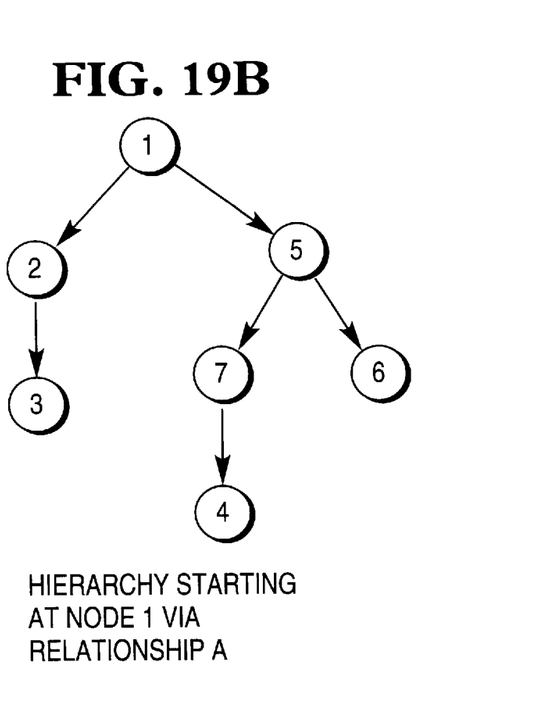
FIG. 19B is a hierarchial model of nodes via relationship A.
Figure 19C:
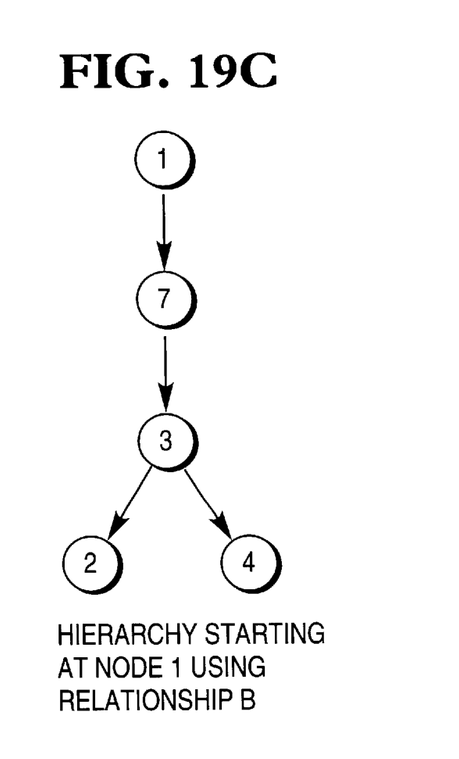
FIG. 19C is a hierarchial model of nodes via relationship B.

As background to the description of the invention, the hierarchy of information to be explored by a user is discussed in terms of nodes and relationships as shown in FIG. 19A. A node is a structure that contains a unit of information and which is related by one or more relationships to other nodes. FIG. 19A shows an information system which includes nodes 1, 2, 3, 4, 5, 6, and 7 that are connected or related to each other via relationships A, B, and C. One or more hierarchies may be modeled from a single information system. For example, FIG. 19B shows the hierarchy model of the nodes in FIG. 19A via relationship A. Likewise, FIG. 19C shows the hierarchy model of nodes in FIG. 19A via relationship B.

Figure 1:
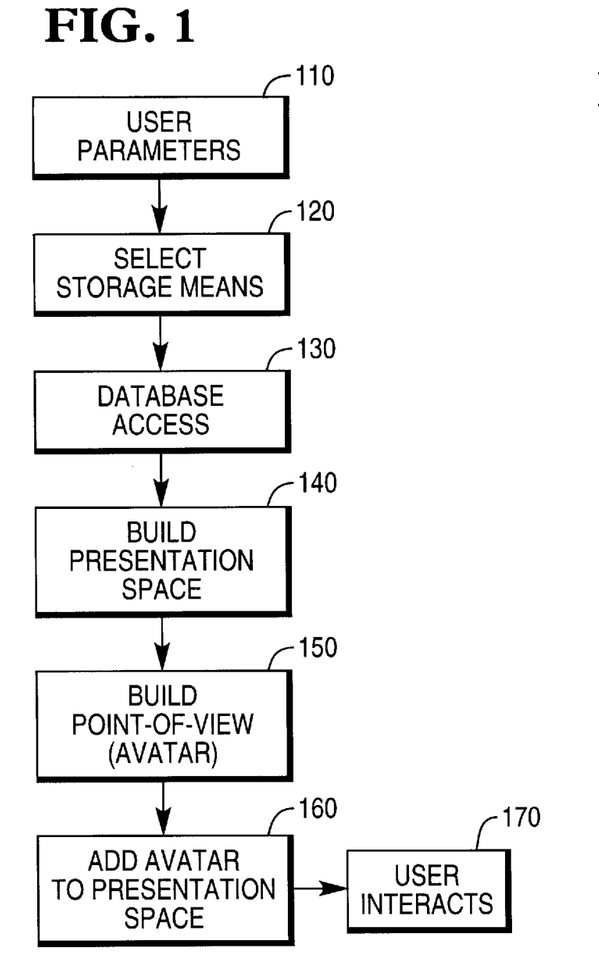
FIG. 1 is an overview of the system.

FIG. 1 provides an overall structure for the system. The user provides parameters 110 through an input means. The parameters may include information such as the name of the information system to be explored, and the kinds of information of interest, and perhaps a starting point for exploration. The parameters are used by the system to select a storage means or database 120. After a database is selected the database is accessed 130 as further explained below and in FIG. 3. From the database access, the system has a list of nodes that are used to build an initial presentation space 140, explained below and in FIG. 4. The system then builds a point of view into the presentation space called an avatar 150, explained below and in FIG. 5. The avatar is added to the visualization structure 160 and the user is then allowed to interact in the presentation space 170 through use of the input means and an image output means.

The input means is a device such as a keyboard, mouse or a Spaceball that can provide signals based on actions from the user. A Spaceball is an input device available from Spatial Data Systems, Inc. that allows movement in each of the three dimensions, x, y and z. It also allows changes in orientation around each of the three axis: roll, pitch and yaw.

An image output means is a device that can provide image as output. For example a display is an image output device that provides information in visible form, such as on a screen of a cathode ray tube or a flat panel display. The visible pattern presented by a display is an "image".

Figure 18:
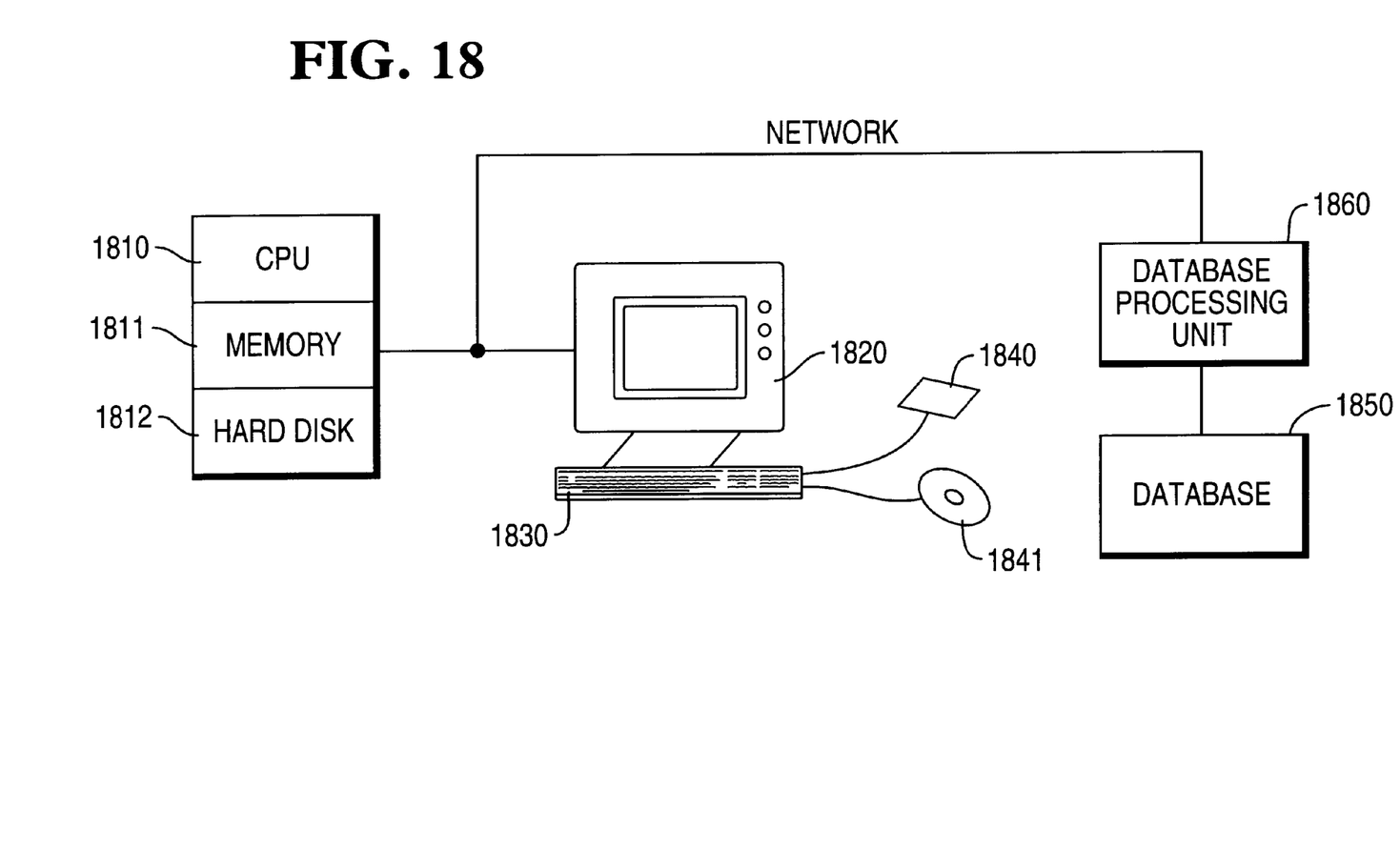
FIG. 18 is a schematic diagram of a preferred hardware configuration.

One setup of a system for developing the invention is set forth in FIG. 18. A computer 1801 is shown which contains a display 1820, keyboard 1830, a mouse 1840, a Spaceball 1841, a central processing unit 1810 which can be an Intel 486, Pentium or Pentium Pro processor, etc., and may be used in conjunction with memory 1811, and a hard disk 1812. The computer 1801 may be connected to a network. The network may contain storage for a database 1850 and may also contain a database processing unit 1860. While this configuration is disclosed for the preferred embodiment, equivalent hardware systems or configurations may be substituted.

1. Storage Means

Figure 2:
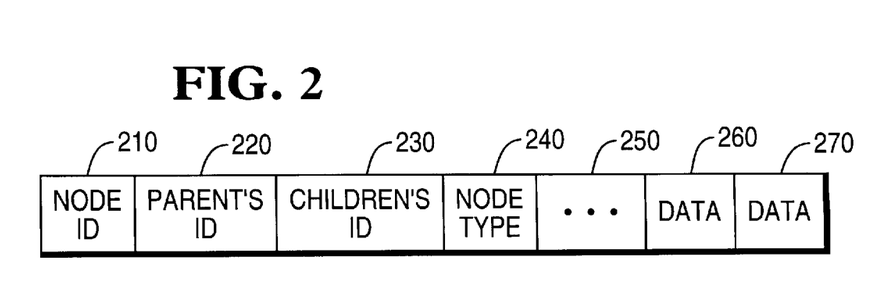
FIG. 2 is a schematic diagram of a node as stored in the database.

The storage means is a repository of information for the information space and means for accessing such information. There are a number of ways the information in the repository is created and updated. In the preferred embodiment, the repository is a standard database where a record in the database contains data that describes the node and its relationship to other records in the database. The information in the storage means may be static or it may change while the system is being used. For example, the storage means may contain data corresponding to sensor values. Changes to the sensor values over time may be accomplished by changing the contents of a node in the storage means or it may be accomplished by the addition or deletion of nodes over time. A schematic representation of a node in the database is shown in FIG. 2. A node has a unique identifier 210. Information about the node may also include its parent identification 220, its children identification 230, and data that characterizes that node 240, 250, 260, and 270.

Figure 3:
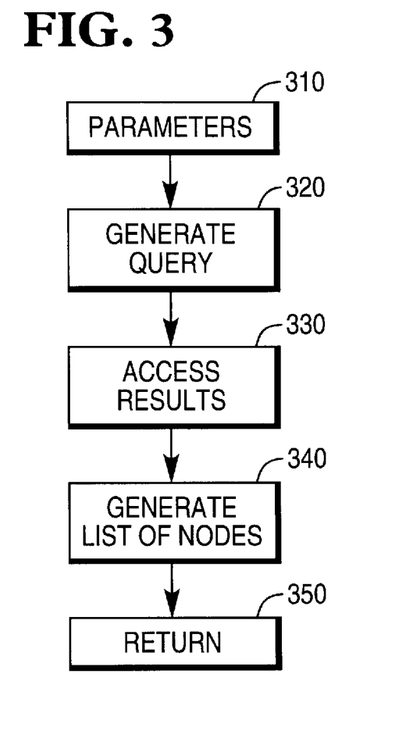
FIG. 3 is a flowchart of one function for accessing the database.

In the preferred embodiment there are functions to access the information in the storage means. These functions may be executed by a database processing means or alternatively by the processing means described in section 2 below. One function, named findNodes( ) for illustrative purposes, receives as input criteria in the form of parameters for selecting one or more nodes from the storage means. For example, the criteria may specify nodes for which the parent identification is "0", null or empty (top level nodes). The storage means returns a set of nodes which are to be represented by graphical elements inside the presentation space. FIG. 3 is a flowchart illustrating how this function might be implemented. First the system gets parameters designating the range of nodes desired 310. The system then generates a query such as a call in SQL 320. The function gets the results 330 and generates a list of nodes 340 that are returned to the user 350. The interface to findNodes( ) is given below:

NodeIDList*findNodes(selectionCriteriaList)

Another function receives as input one of the nodes returned by findNodes( ) and parameters designating whether a parent or child is requested and the relation to be used. This function, named followRelation( ) for illustrative purposes, returns the parent or child of the node received along some relation. The parameter designating the type of relation is used because there may be more than one hierarchical organization of the information space. The parent of a node could be two different nodes if the information space contains more than one organization.

For example in a "Family Tree" database, each record would contain the name of a person, the name of their biological father, and the name of their biological mother. One hierarchical view of the database is the "Father-Child" view of the database while a different hierarchical view of the same database is the "Mother-Child" view. In this example the parameter may designate which biological parent is of interest. The second function returns either the parent node, children nodes or no nodes. If no nodes are returned, the node supplied to the second function has no nodes fitting the query requested (i.e. no parent or child exists).

Figure 4:
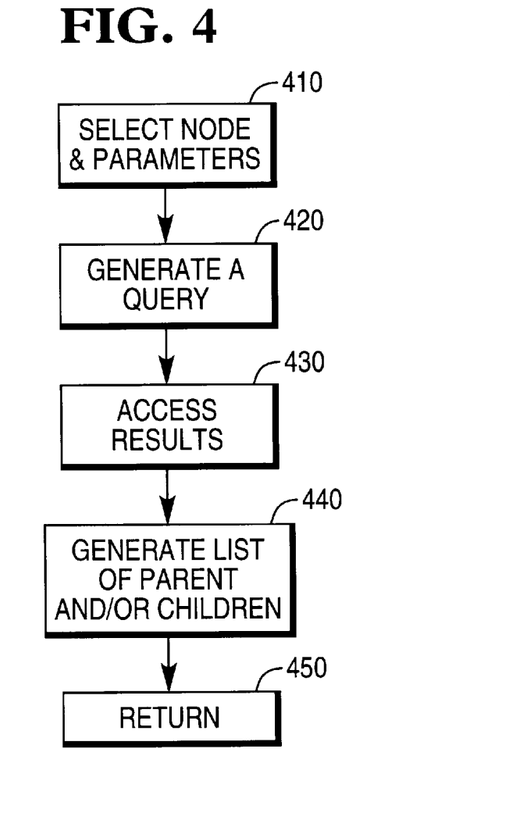
FIG. 4 is a flowchart of another function for accessing the database.

FIG. 4 is a flowchart of how followRelation( ) might be implemented. The function receives the node and parameters 410. The function then generates a query 420 and accesses the results 430. From the results, the function returns the parent or the children of the node 440 and this information is returned to the user 450. An example of the interface to followRelation( ) is given below:

NodeIDList*    followRelation( relationName, parentOrChildFlag, startNodeID)

Another function supplies more information about a specific node. For illustrative purposes this function is named getNodeAttributeso( ). The information that is returned is a data structure containing the attributes or values for the specified node. The attributes or values may also contain an aggregation of information about the children of the node.

Figure 5:
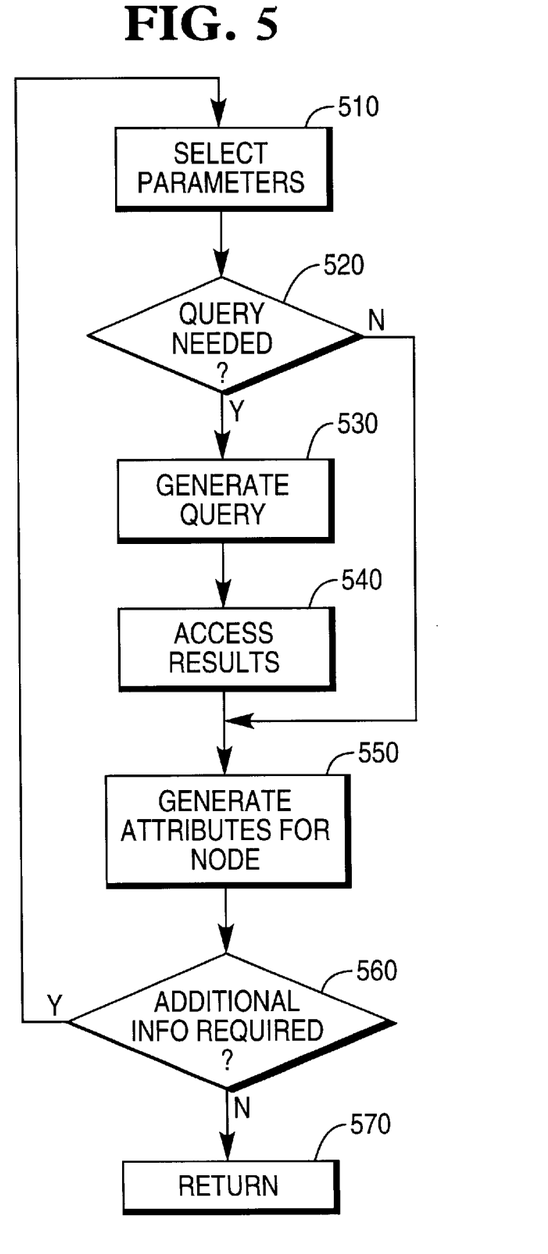
FIG. 5 is a flowchart of another function for accessing the database.

FIG. 5 is an example of how this function might be implemented. The parameters designating the node and the information requested from the node is supplied to the function 510. The function then determines if a query is needed 520. The reason a query may not be needed is because the information desired has already been accessed by a previous call. If a query is needed a query is generated 530, the results are accessed 540 and a list of attributes for the node are generated 550. If no query is needed, a list of attributes is generated 550. From the list of generated attributes, the function determines whether any more information about the node is required 560. If more information is required the function loops again starting at selecting parameters. If no additional information is required, the function returns to the user with the information requested 570. The interface for getNodeAttributeso( ) is given below:

```
            NodeStructure*    getNodeAttributes
              ( attributeSpecifiers, nodeID )
```

Note that it is possible to combine functions followRelation( ) and getNodeAttributeso into a single function that returns a list of node descriptions where the node description contains the parent/child information and the node attribute information.

2. Processing Means

The processing means performs three tasks: (1) creation and update of the presentation space; (2) creation of the viewpoint or avatar; and (3) processing that allows the user to interact in the presentation space through use of the avatar or view point.

A. Creation and Update of the Presentation Space

The presentation space is conceptually a tree with visualization elements at each node of the tree graph. The initial presentation space is created by the processing means. In the preferred implementation, this presentation space is a three-dimensional graphics space with a "scene-root node" that defines the origin of the space. To populate the presentation space with visualization elements, the processing means begins by making a call to the storage means using findNodes( ) shown in FIG. 3. A list of nodes is returned by the first function.

Figure 13:
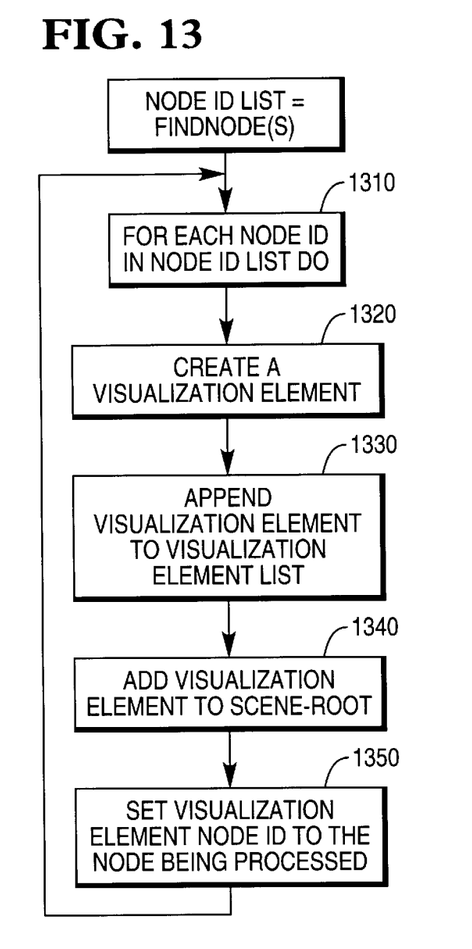
FIG. 13 is a flowchart of the creation of the presentation space.

As shown below and in FIG. 13, the processing means creates a visualization element for each of the nodes returned by the function 1320 and appends the visualization element to a visualization element list 1330. The visualization element is also added as a child of the scene-root 1340. The infoNode attribute of the visualization element is set to the node identification so that the node associated with the visualization element is easily accessed and identified 1350. Note that just as information objects may be static or updated in real time, so too are visualization elements. For example, a visualization element that is data driven may not change while an animated visualization element is updated in real time.

```
    nodeIDList = findNodes( selectionCriteriaList )
    [1310] for each nodeID in nodeIDList do
        [1320] visElem = new VisualizationElement
            /* Create list of top level
                visualization elements */
        [1330] rootVisElementList —> append
            ( visElem )
        [1340] scene-root —> addChild ( visElem )
            /* Set the infoNode attribute in the
                visualization element to identify
                the node represented by this
                element */
        [1350] visElem —> infoNode( nodeID )
    end /*for*/
```

Figure 6:
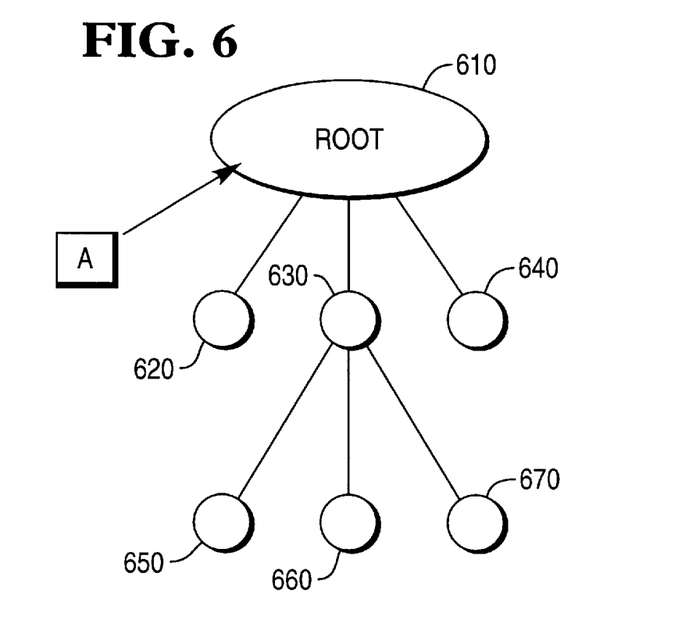
FIG. 6 is a schematic representation of the presentation space.

To populate the tree or the scene-root, for each of the nodes returned by the first function, the processing means creates a hierarchical tree of these visualization elements as shown in FIG. 6 by making calls to the followRelation( ) shown in FIG. 4. As shown below and in FIG. 14, each visualization element corresponds to a node in the storage means and the hierarchy of the visualization elements corresponds to the hierarchy of the information nodes.

Figure 14:
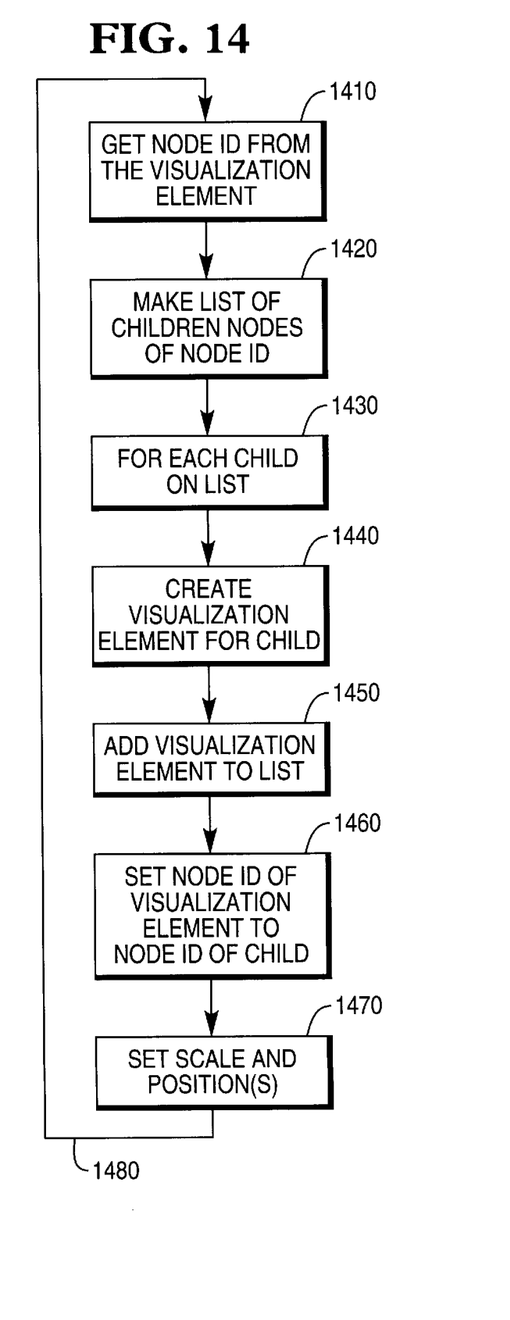
FIG. 14 is a flowchart of expanding the presentation space.

Function expandVisTree( ) receives as input a visualization element and the relation type of the information to be built. The node type is accessed from the visualization element and saved in NodeID 1410. The function followRelation( ) is called to get a list of the node's children 1420 which is kept in nodeIDList. A recursive loop is now started: (1) For each node in the node list nodeIDList, the processing means creates a visualization element for the node 1440; (2) A list is created of the top level visualization elements 1440, 1450; (3) The node identification field of the visualization element is set to the node identification for future access 1460; (4) The position and scale of the child visualization element is set relative to its parent's coordinate system to convey its relationship with its sibling visualization elements; (5) The child is "scaled" (i.e., the size of the child and all of its children recursively is reduced by some scale factor) so that it and all of its siblings will fit within the region defined by the parent visualization element 1470; and (6) The function calls itself to recursively expand the children of the current node 1480. In the preferred implementation, all of the immediate children of the visualization element are scaled by the same amount. This amount is termed "region scale".

Figure 15:
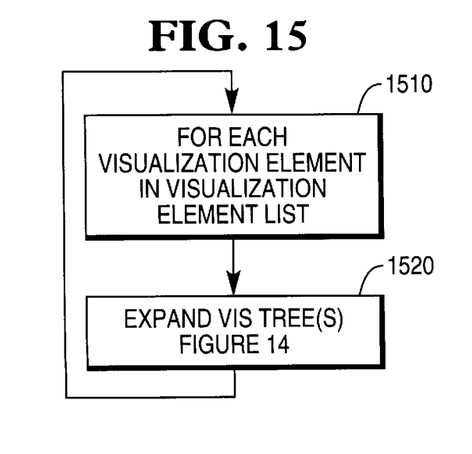
FIG. 15 is a flowchart of how each visualization element is expanded.

```
    Function expandVisTree( VisualizationElement visElem,
        Relation relationName)
    [1410] nodeID = visElem —> infoNode( )
    [1420] nodeIDList = followRelation( relationName,
        ChildFlag, nodeID)
        /* The "followRelation" function is shown in
            FIG. 4.
            For each of the root visualization elements,
                build a visualization hierarchy */
    [1430] for each nodeID in nodeIDList do
        /* If the nodeIDList is empty, this code will be
            skipped and recursion ends. */
        [1440] childVisElem = new VisualizationElement
            ( );
            /* Create a list of the top level
                visualization elements */
        [1450] visElem —> addChild (childVisElem);
        [1460] childVisElem —> infoNode( nodeID)
            /* Set the infoNode attribute in the
                visualization element */
        [1470] setScaleAndPosition( visElem,
            childVisElem);
            /* The position of the child visualization
                element will be set relative to its
                parent's coordinate system to convey its
                relationship with its sibling
                visualization elements. The child will
                also be scaled so that it and all of its
                siblings will fit within the region
                defined by the parent visualization
                element. */
        [1480] expandVisTree( childVisElem, relationName);
            /* this continues the recursive construction
                of the visualization tree. */
        end for
    end function
        To start the construction of the visualization
    tree, each of the root visualization elements will be
    expanded as shown by the following pseudo code segment:
        [1510] for each visElem in rootVisElementList do
            [1520] expandVisTree( visElem, relationName );
        end for;
```

Each visualization element 610, 620, 630, 640, 650, 660 and 670 represents a region in the presentation space. The region of space defined by a visualization element contains the regions of space for all of the visualization element's children and recursively all of its children's children. Each one of the visualization elements in the presentation space has an affine spatial transformation. In the preferred implementation, the affine spatial transformation is a mathematical function represented by a four by four transformation matrix, which is standard practice in the computer graphics field.

The affine spatial transformation as used in computer graphics is described in more detail in text books such as "Fundamentals of Interactive Computer Graphics" by J. D. Foley and A. van Dam, Addison Wesley Publishing Company, Inc., 1982. They enable the use of "hierarchical coordinate systems" where a transformation on a parent coordinate system affects all of the child coordinate systems. An affine transformation is a linear transformation that preserves parallel geometry. Transformations such as scaling, translation (movement) and rotation are examples of affine transformations, while a perspective viewing transformation is not. The hierarchy of visualization elements in turn defines a hierarchy of coordinate systems. When a visualization element is scaled, rotated, or moved, the transformation will affect all of the children of the node and the children's children recursively.

From the attributes of an information node, the processing means determines how the visualization element will be rendered onto the display means. The visualization elements may have attributes that control their appearance such as shape and color. The appearance of the visualization element may also be determined by its size as seen from some point of view. For example, if a visualization element is viewed from a large distance, its size on the display device may be small, while if the same object is viewed close up, it may appear quite large. If a visualization element's appearance is small, a simple representation is rendered. If a visualization element appears large, a more detailed representation may be rendered. In addition, it is not required that a visualization element have a visible appearance. If it does not have a shape associated with it, it will be invisible with no perceived boundaries, but its children may be visible within the invisible boundaries of their parent.

Since many visualization elements may exist within a presentation space, it is not possible or realistic to render each and every visualization element in the presentation space. To determine which visualization elements are rendered, "culling" and "pruning" of the presentation space tree may be performed. Culling means that visualization elements that are outside the view volume are not rendered. Pruning means that branches of the tree that are not within the view volume are "pruned" or not rendered. Pruning branches of the tree is possible because a visualization element completely bounds its children. If a visualization element is outside the view volume the branch of the tree designated by the visualization element is "pruned" and not rendered.

Determination of visibility relative to some point of view is well known within the graphics field. In the preferred implementation, each visualization element has a "bounding volume" defined that completely encloses the visualization element. This bounding volume is then intersected with the view volume to determine visibility. If the bounding volume does not intersect the view volume, then the view element is culled and the branch of the presentation space beneath the visualization element is pruned.

B. Creation of the Viewpoint or Avatar

A point-of-view is required for the presentation space to be rendered onto the display means. A point-of-view is defined by (1) a location in the presentation space, (2) an orientation that specifies the direction of view and the orientation of the viewpoint relative to the presentation space (i.e., a line of sight vector and a vector that indicates which way "up" is), and (3) the view volume. The view volume is the region of the presentation space that will be rendered to the display means. The view volume is typically specified by a field-of-view attribute and two attributes known as the "near clipping plane" and the "far clipping plane." The view volume is defined as that area within the field of view and between the near clipping plane and the far clipping plane. When the presentation space is a three dimensional space and a perspective viewing projection is used, the view volume is a truncated pyramid or frustum. If an orthographic viewing projection is used the field-of-view angle is replaced by a field-of-view width and the resulting view volume is a rectangular parallelepiped.

Figure 7A:
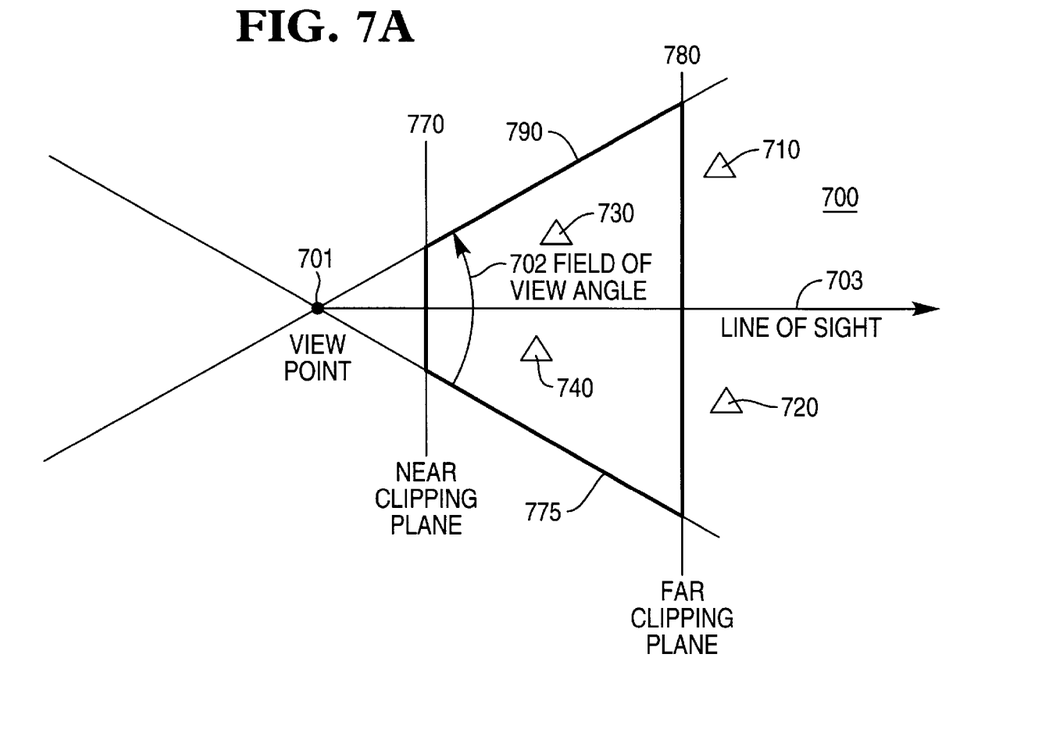
FIGS. 7A–7B are a schematic representation of perspective and orthographic transformations.
Figure 7B:
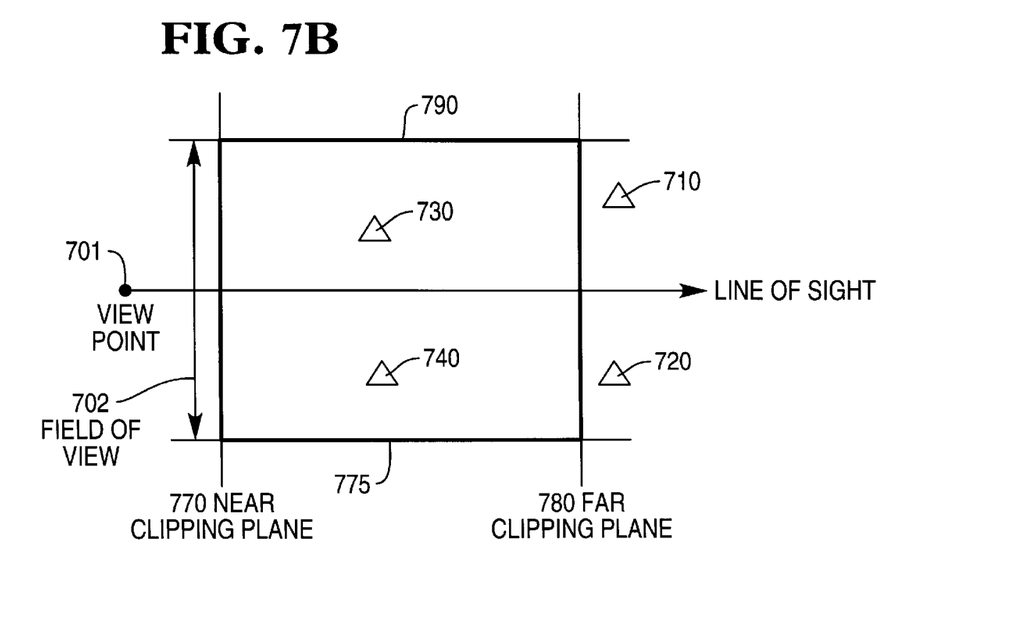

FIGS. 7A and 7B show a presentation space 700 containing a number of visualization elements 710, 720, 730 and 740. An avatar or viewpoint is located at position 701. A perspective viewing projection is shown in FIG. 7A. The angle at 702 is known as the field of view angle. The line 703 that bisects the field of view angle is known as the line of sight. The near clipping plane 770 and far clipping plane 780 (or lines in this figure) are perpendicular to the line of sight. The position of the near and far clipping planes are specified by the distance from the focal point along the line of sight. For example, in FIG. 7A, in a perspective transformation the view volume is that area bounded by the near clipping plane 770, the far clipping plane 780, and the field of view angle 702 defined by lines 790 and 775. As shown in FIG. 7B, in an orthographic transformation, the view volume is defined as that area bounded by the near clipping plane 770, the far clipping plane 780 and the lines 790 and 775. While more complex view volumes may be defined, the preferred implementation uses these forms of orthographic and perspective view volumes.

The process of projecting the contents of the three dimensional view volume into a planar image is well known in the computer graphics field and is described in more detail in text books such as "Fundamentals of Interactive Computer Graphics" by J. D. Foley and A. van Dam, Addison Wesley Publishing Company, Inc., 1982.

In the invention, the viewpoint or avatar has an additional attribute, "viewScale," that scales the view volume. In the preferred implementation, the viewScale attribute is represented as a positive real number with an initial value of 1.0. The effect of making the viewScale smaller is to allow smaller visualization elements to be seen. How this is accomplished depends upon the type of viewing transformation being used. With a perspective viewing transformation, the distance from the viewpoint to the near clipping plane is scaled by a function: viewScale (i.e. viewScale * near). In the preferred implementation, the ratio between the near and far clipping plane distances is kept constant by scaling both the near and far clipping plane distances by the same viewScale. With an orthographic viewing projection, the field-of-view width is scaled by viewScale. In the preferred implementation, the near and far clipping planes for the orthographic viewing transformation are scaled in the same fashion as with the perspective viewing transformation.

Figure 16A:
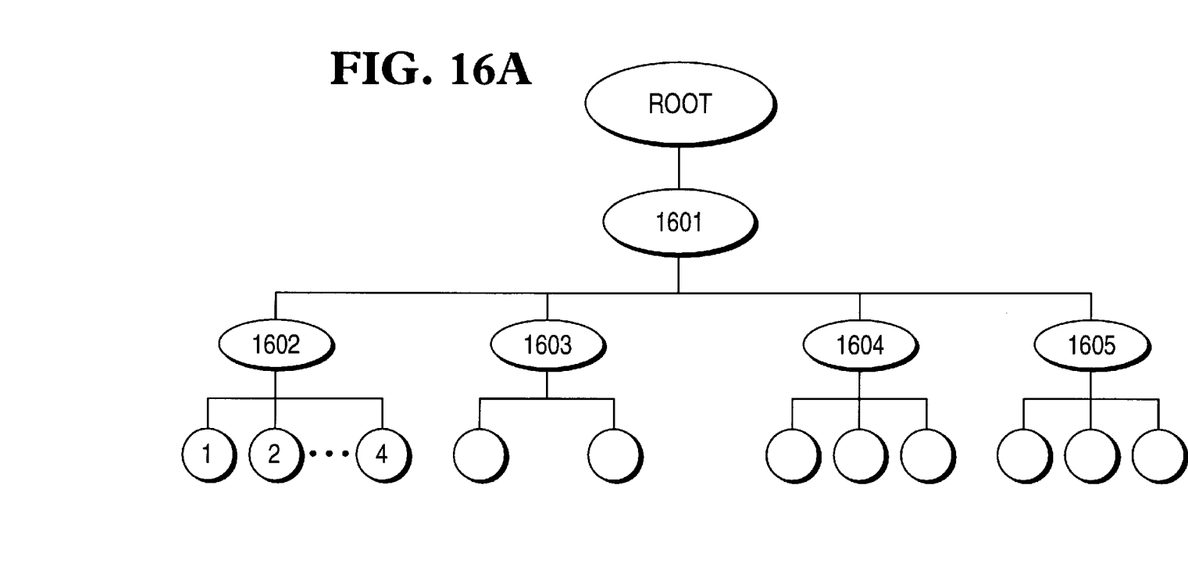
FIG. 16A is a two-dimensional representation of the parent-child hierarchy.
Figure 16B:
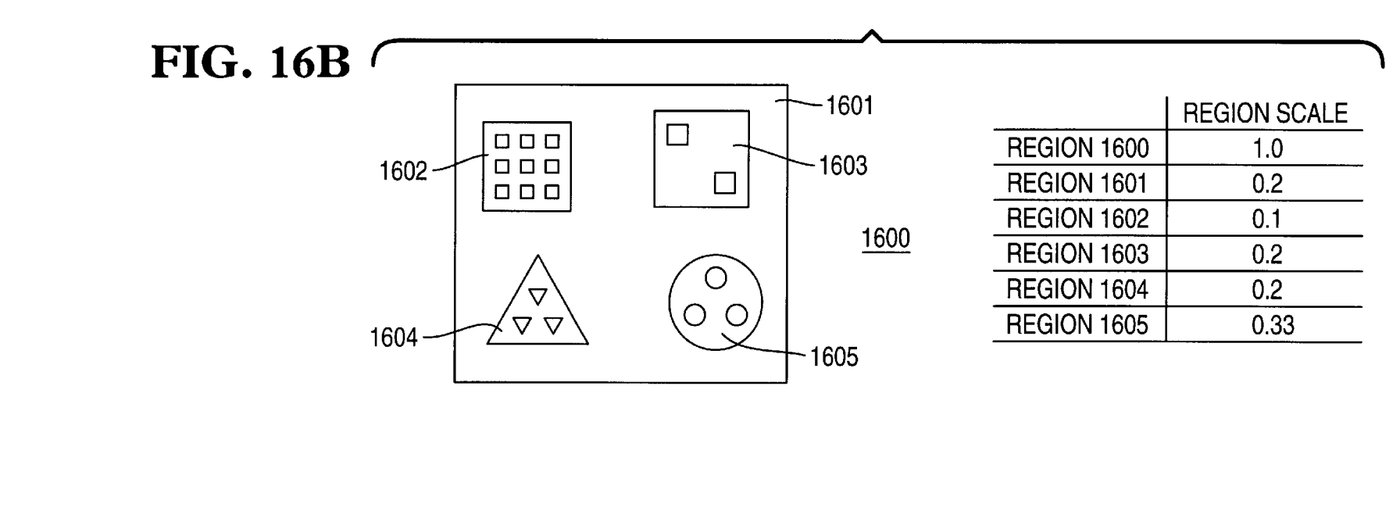
FIG. 16B is a two-dimensional representation of visualization elements.

An example of how the viewscale works is shown in FIGS. 16 and 17. FIG. 16A shows a schematic representation of a parent node 1601 and its children 1602, 1603, 1604 and 1605. A visualization element is created for each node as represented in FIG. 16B. Associated with each visualization element is a region scale attribute. For example, the region scale for visualization element 1600 is 1.0 because that is the complete presentation space. The view scale for the other visualization elements are as follows:

| Visualization Element | Region Scale |
| --- | --- |
| 1600 | 1.0 |
| 1601 | 0.2 |
| 1602 | 0.1 |
| 1603 | 0.2 |
| 1604 | 0.2 |
| 1605 | 0.33 |

Figure 17A:
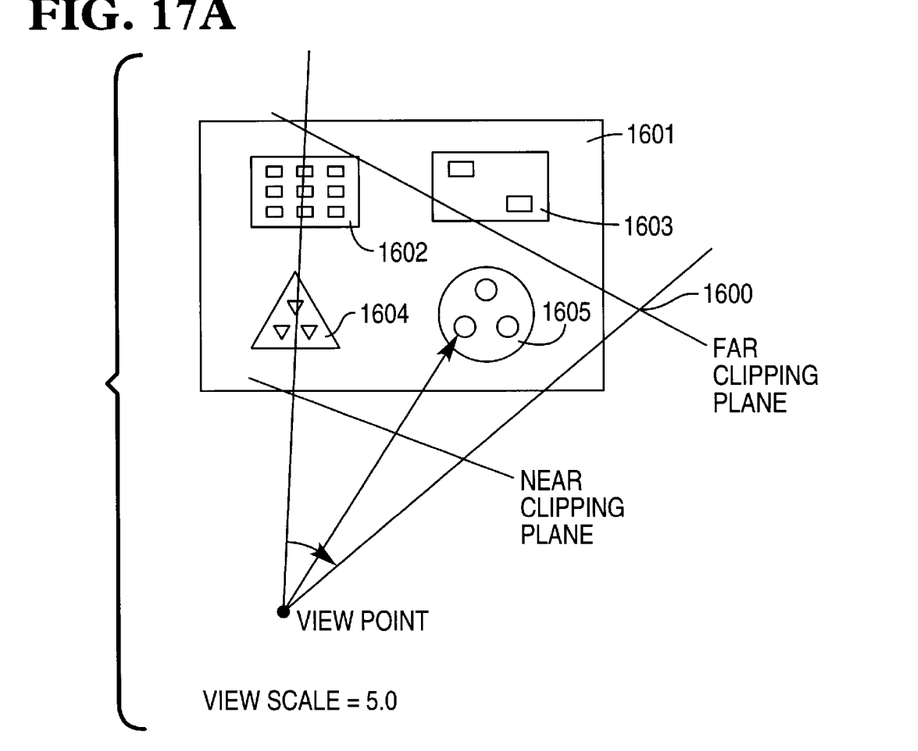
FIGS. 17A–17D are two dimensional representations of the view volume.
Figure 17B:
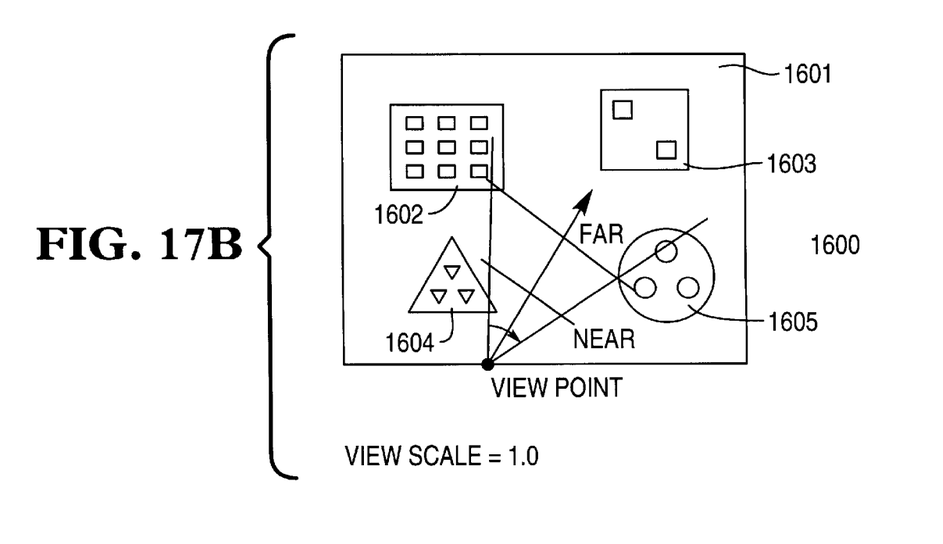
Figure 17C:
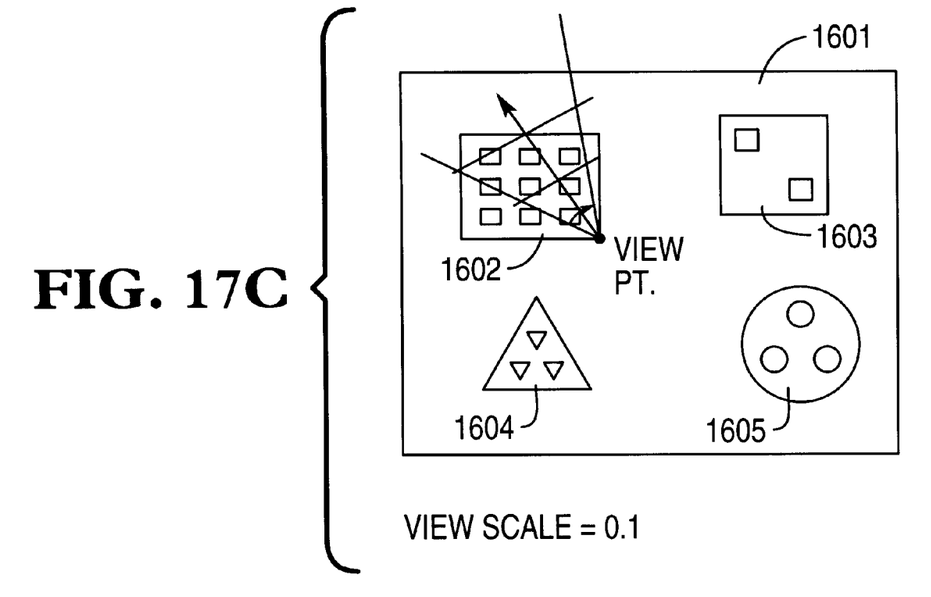
Figure 17D:
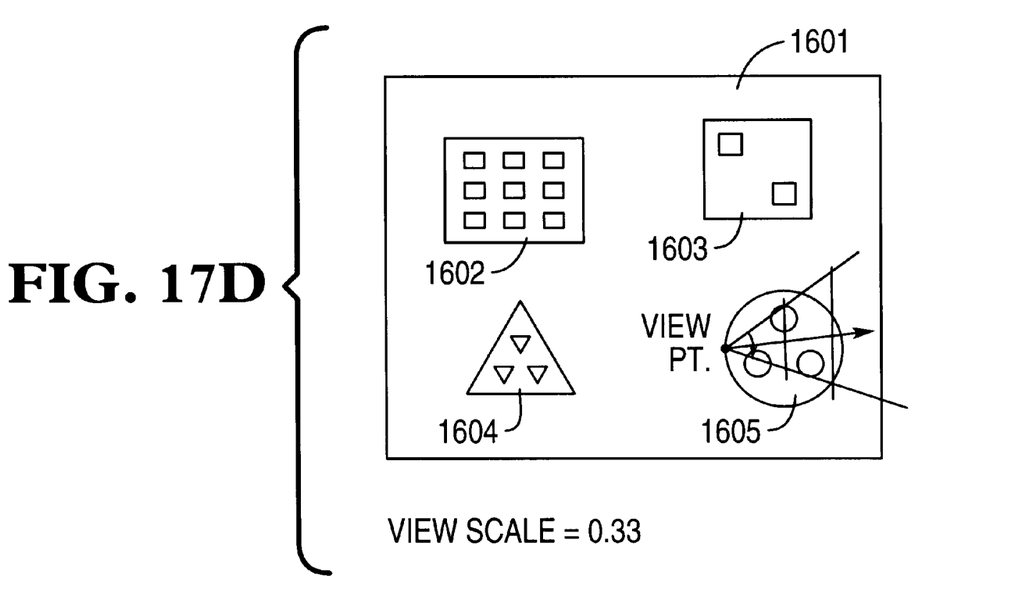

FIG 17A shows the view point and view volume for when the view scale is 5.0 and the avatar or viewpoint is outside the region of visualization element 1601. As the avatar enters the region of the visualization element 1601, the view scale is multiplied by the region scale associated with 1601. The resulting view scale value is 1.0. With a smaller view scale closer objects appear bigger and with more detail, FIG. 17B. As the avatar next enters the region of visualization element 1602, the view scale is further reduced by a factor of 0.1 so fewer objects are rendered but the objects that are rendered are shown in more detail. As shown in FIG. 17D as the avatar exits 1602, the avatar view scale is divided by 0.1 returning the view scale to 1.0. As it enters 1605 the view scale is changed to 0.33.

An avatar is a viewpoint that also has an appearance associated with it. In the preferred implementation an avatar is defined that combines properties of the visualization element and viewpoint. The avatar is an animated figure or icon that represents the user in the presentation space. The user explores the information system by moving the avatar through the presentation space. As the avatar moves, different visualization elements will fall within the view volume. Only the visualization elements that intersect the view volume will be visible on the display means.

The avatar is implemented as a data structure that extends the visualization element by adding a viewing transformation or a viewing projection. This projection can be an orthographic projection which is affine or a perspective viewing transformation that is not affine. The location and orientation of the avatar are properties that come from having the avatar being a visualization element. Since it is a visualization element, it can be attached to another visualization element within the presentation space. Therefore the movement of the avatar is relative to the coordinate system defined by the visualization element to which the avatar is attached. It is possible to have multiple avatars within one presentation space. The avatars may belong to a single user in which case the user can switch between avatars. The avatars may also belong to different users in the case where multiple people are exploring the same information space. Since the avatar is itself a visualization element, the avatars may be visible to the other avatars.

C. User Interaction in the Presentation Spaces

The user interacts with the system through the input means, which may include but which is not limited to keyboard, mouse and a Spaceball. Any interaction from the user utilizing an input means generates an event with attribute(s) that characterize the input. An event is represented by a data structure that at a minimum indicates the event type. The data structure may be extended to contain additional event parameters. For example, a keystroke from the user generates an event with an attribute that indicated that a key was pressed and an attribute that indicates the specific key that was pressed. In general, events communicate a specific occurrence or specific situation.

Events are handled within the processing means by an "event manager." An event manager accepts events and acts upon them using the information contained within the event data structure. When an event manager receives an event, it may (1) change its internal state, (2) make a record of the event that occurred, (3) generates an action as a result, or (4) some combination of the above.

Figure 8:
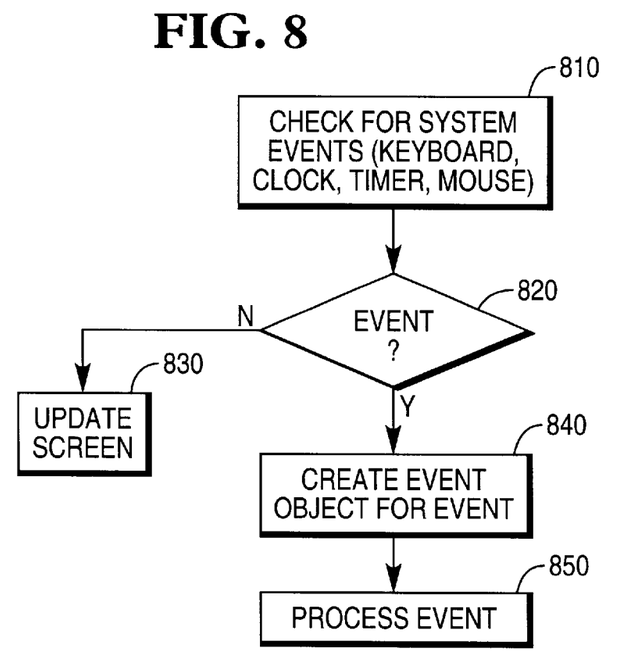
FIG. 8 is a flowchart of the event handler.

FIG. 8 shows the flowchart for an event manager. An event manager first checks for system events 810. This is typically performed by polling or by queuing system calls. Events can be divided into three classes. There are user events which include mouse movement and key presses. The second class are region or boundary events where the avatar moves from one visualization element or region in the presentation space to another. The third type of events are visibility events that occur when the visualization elements are rendered either with more or less detail. For example, as an avatar moves toward an object the object becomes bigger and is rendered with more detail. Conversely, as the avatar moves away from an object, the object becomes smaller and the detail in the object is reduced. An event may be generated to signal that the level of detail is changing or needs to be changed.

If a system event is received, the event manager creates an event object for the event received 840. An event object contains attributes describing the kind of event and the characteristics of the event such as a mouse movement or key press. The event manager then processes the event 850 as explained below and in FIG. 9 and FIG. 10.

If no event is received, the event manager calls the procedures to update the screen 830. The process of updating the screen uses standard rendering techniques from the computer graphics field. The structures within the presentation space, including the avatar, are traversed; at each node in the presentation graph the coordinate transformations are applied and drawing operations are performed based upon the attributes of the visualization elements (e.g., shape, color, etc.).

Figure 9:
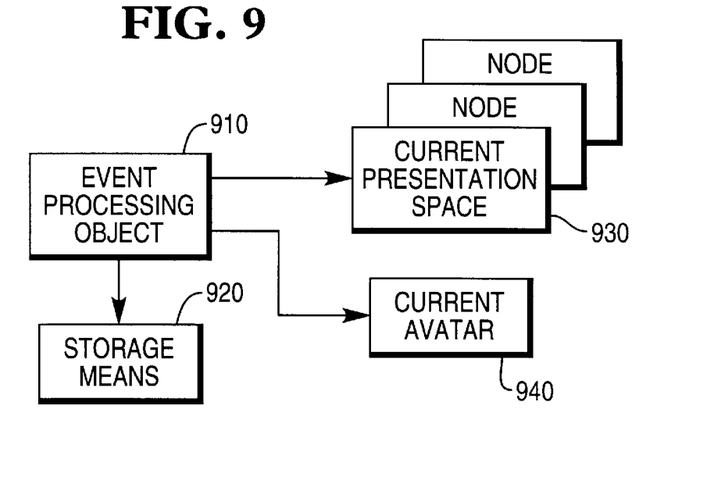
FIG. 9 is a relationship diagram of the event handler.
Figure 10:
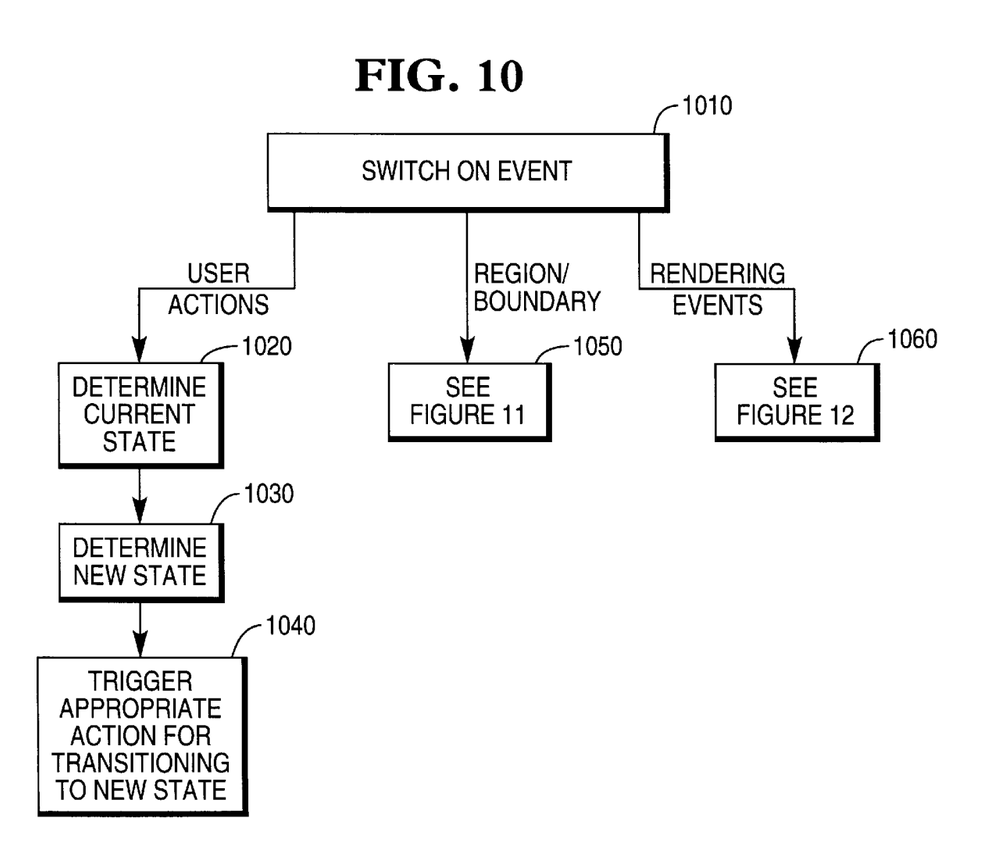
FIG. 10 is a flowchart of how an event is processed.

FIG. 9 is a relationship diagram of events. An event manager 910 accesses the storage means 920, the current presentation space 930 and the avatar 940. A flowchart of the event manager is presented in FIG. 10. The event manager may be implemented as a switch statement on the class of event 1010. If the event is a user event, the event manager first determines the current state of the system 1020, determines the new state of the system 1030 and triggers the actions that correspond to the state transition 1040. These actions can include the creation and deletion of objects, the changing of object attributes, the changing of relations between objects, and the changing of local state variables. The effect of these actions may be to change some aspect of the presentation space or it may cause some change in the information system being presented.

Figure 11:
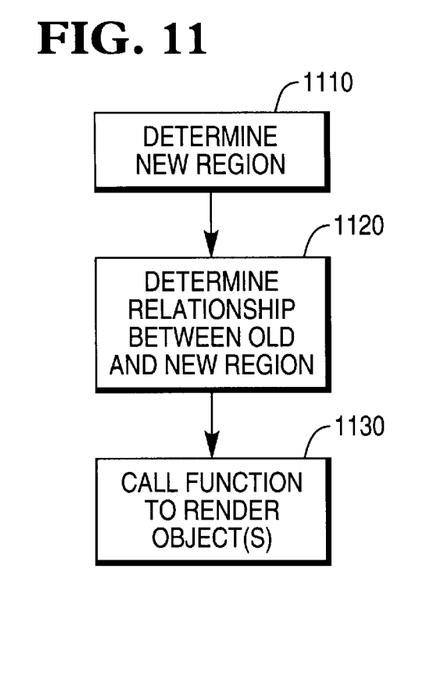
FIG. 11 is a flowchart of how a region/boundary event is processed.

As shown in FIG. 11, if the event is a region or boundary event, the system first determines the new region 1110, determines the relationship between the new and old regions 1120. This includes the depth of the lowest common visualization element. When the avatar enters or exits a region, the viewScale attribute of the avatar must be adjusted to correspond to the accumulated scale (from the root to the current region) of the region being entered. This scaling enables the viewing of the multi-resolution presentation. This is accomplished by function 1130 which takes as arguments (1) the new region, (2) the relationship between the old and new regions, and (3) the lowest common visualization element. In addition to adjusting the viewScale attribute of the avatar, function 1130 may cause additional actions to be performed, such as expanding the part of the visualization structure within the new region, or deleting visualization elements within the old region.

Figure 12:
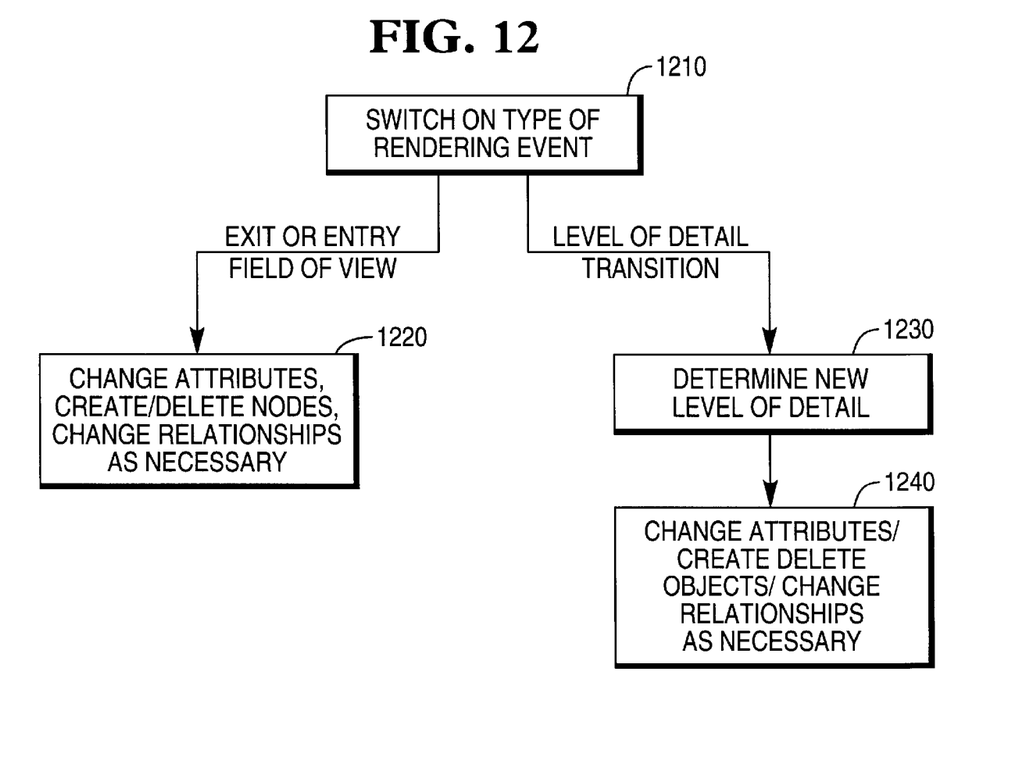
FIG. 12 is a flowchart of how a rendering event is processed.

As shown in FIG. 12, if the event is a rendering event, the system may contain a case statement on the type of rendering event 1210. If the event is one which moves the avatar so that objects enter and exit the field of view, the system calls functions to change the attributes of the objects from visible to non visible or vice versa. The system may also add or delete visualization elements 1220 depending if they are in the field of view and it may also change relationships of visualization elements as necessary 1220. The other type of event for rendering an object; is changing the level of detail of a visible object. For this type of event, the system determines the new level of detail 1230 and then changes the attributes of the object, it creates or deletes objects and changes relationships between objects as necessary. One use of this aspect is that when initially expanding the visualization element tree, a fixed depth is specified so that only the top levels are created. As the user moves the avatar through the presentation space and the level of detail changes, the system may respond to the events by expanding the level of detail for specific branches of the presentation space or by discarding low level detailed visualization elements as they fall outside the limits of visibility.

While the invention has been described in detail with specific reference to preferred embodiments thereof, it is understood that variations and modifications thereof may be made without departing from the spirit and scope of the invention.

What is claimed is:

1. A system for enabling a user to navigate and access information objects within a structured presentation space in which the size of graphical representations of the information objects is a function of relationships of the information objects and position of a user view point within the structured presentation space, comprising:
   (a) a storage means for storing information objects, wherein the information objects are stored in a hierarchical format whereby a base information object may have a parent information object and at least one child information object;
   (b) a video display for displaying visual information to the user;
   (c) an input means for receiving input from the user; and
   (d) a processing means for:
      (i) modeling the information objects to be within the structured presentation space;
      (ii) assigning a view point within the presentation space;
      (iii) responsive to the input means, moving the view point within the structured presentation space, wherein the view point may be moved between the information object, the parent information object, and the child information object, and wherein the scale of movement of the view point is based relative to the scale of the information object containing the view point; and
      (iv) displaying the information objects on the video display with a multi-dimensional perspective view corresponding to the view point, wherein each child information object is displayed as being within the information object, the information object is displayed as being within the parent information object.

2. The system of claim 1, wherein the storage means comprises a hard disk drive.

3. The system of claim 1, wherein the video display comprises a screen of a cathode ray tube.

4. The system of claim 1, wherein the video display comprises a flat panel display.

5. The system of claim 1, wherein the input means comprises a keyboard.

6. The system of claim 1, wherein the input means comprises a mouse.

7. The system of claim 1, wherein the input means comprises a means for allowing the user to move in each of three dimensions.

8. The system of claim 1, wherein each information object comprises a static information object.

9. The system of claim 1, wherein each information object comprises an information object that is updated in real-time.

10. The system of claim 1, wherein the storage means further comprises a database server processing means for accessing at least one information object.

11. The system of claim 1, wherein the storage means further comprises a database server processing means for generating a list of parent information objects.

12. The system of claim 1, wherein the storage means further comprises a database server processing means for generating a list of children information objects.

13. The system of claim 1, wherein step (iv) comprises the steps of:
   (a) generating a view volume within the structured presentation space;
   (b) scaling the view volume in response to the location of the view point;
   (c) culling information objects within the view volume;
   (d) pruning information objects within the view volume; and
   (e) rendering the information objects within the view volume on the video display.

14. The system of claim 1, wherein the processing means performs the steps of:
   (a) generating a hierarchial presentation space from groups of information objects;
   (b) generating a view port for navigating in the presentation space;
   (c) responsive to the input means moving the view port in the presentation space; and
   (d) updating the presentation space responsive to the movement of the view point.

15. The system of claim 1, wherein step (i) comprises the steps of:
   (a) generating a presentation scene-root;
   (b) generating a list of information objects;
   (c) generating a visualization element for each information object;
   (d) appending each visualization element to the presentation scene-root;
   (e) generating the children of each visualization element;
   (f) generating a visualization element for each child; and
   (g) setting the child visualization element coordinates relative to the parent.

16. The system of claim 1, wherein step (i) comprises the steps of:
   (a) generating a presentation scene-root;
   (b) generating a list of information objects;
   (c) generating a visualization element for each information object, wherein each visualization element comprises a static visualization element;
   (d) appending each visualization element to the presentation scene-root;
   (e) generating the children of each visualization element;

(f) generating a visualization element for each child; and (g) setting the child visualization element coordinates relative to the parent.

17. The system of claim 1, wherein step (i) comprises the steps of:

(a) generating a presentation scene-root;

(b) generating a list of information objects;

(c) generating a visualization element for each information object, wherein each visualization element comprises a visualization element that is updated in real-time;

(d) appending each visualization element to the presentation scene-root;

(e) generating the children of each visualization element;

(f) generating a visualization element for each child; and (g) setting the child visualization element coordinates relative to the parent.

18. The system of claim 1 wherein information objects displayed on the video display are displayed within a view volume comprising an area bounded by a near clipping plane and a far clipping plane.

* * * * *